Figure 1:
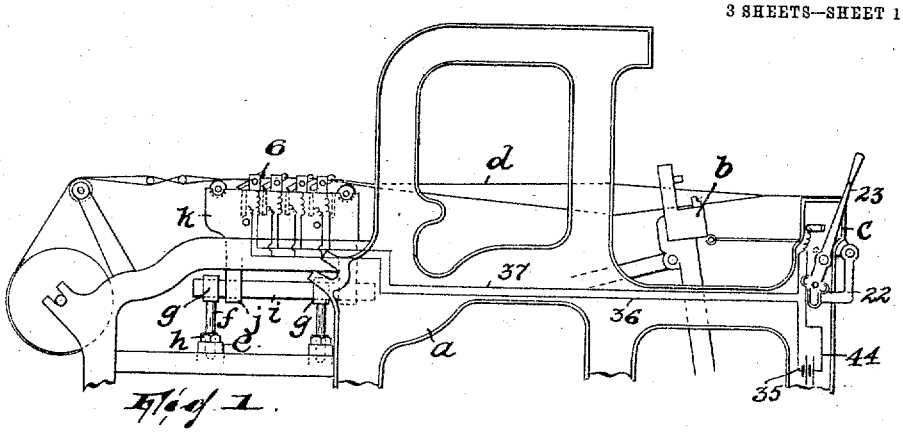

No. 12,423. REISSUED DEC. 12, 1905.

J. B. WHITNEY.

ELECTRIC STOP MOTION FOR TEXTILE MACHINERY.

APPLICATION FILED OCT. 2, 1905.

3 SHEETS—SHEET 1.

WITNESSES:

Wm. D. Bell.

Adele Glatt

INVENTOR

Joseph B. Whitney

BY

Arthur Stewart

ATTORNEYS.

No. 12,423. REISSUED DEC. 12, 1905.

J. B. WHITNEY.

ELECTRIC STOP MOTION FOR TEXTILE MACHINERY.

APPLICATION FILED OCT. 2, 1905.

3 SHEETS—SHEET 2.

WITNESSES:

Wm. D. Bell.

Adele Glatt.

INVENTOR,

Joseph B. Whitney,

BY

Arthur Stewart,

ATTORNEYS.

No. 12,423. REISSUED DEC. 12, 1905.

J. B. WHITNEY.

ELECTRIC STOP MOTION FOR TEXTILE MACHINERY.

APPLICATION FILED OCT. 2, 1905.

3 SHEETS—SHEET 3.

WITNESSES:

Wm. Dwell.

Adele Glatt.

INVENTOR,

Joseph B. Whitney,

BY Carter & Howard,

ATTORNEYS.

UNITED STATES PATENT OFFICE.

JOSEPH B. WHITNEY, OF BROOKLYN, NEW YORK.

ELECTRIC STOP-MOTION FOR TEXTILE MACHINERY.

No. 12,423. Specification of Reissued Letters Patent. Reissued Dec. 12, 1905.

Original No. 790,768, dated May 23, 1905. Application for reissue filed October 2, 1905. Serial No. 281,092.

*To all whom it may concern:*

Be it known that I, JOSEPH B. WHITNEY, a citizen of the United States, residing in Brooklyn, State of New York, have invented a certain new and useful Electric Stop-Motion for Textile Machinery, of which the following is a specification.

This invention relates to mechanism adapted to automatically stop textile machinery upon any irregularity in the action thereof; and it has reference particularly to such mechanisms as applied to that portion of textile machinery which might be classified as that having to do with the drawing of threads or other filaments longitudinally, as in spinning, weaving, warping, &c.

It has heretofore been proposed to stop textile machinery when any irregularity occurs in the operation thereof by the use of electromagnetic mechanism. For instance, in weaving fallers or detectors have been arranged on the warp-threads in such manner that upon a break in any of the latter the corresponding faller or detector drops, closing a circuit, whereby a magnet is actuated to move its armature and through it certain mechanical contrivances which either throw off the power from the loom or brake it.

One of the objects of the present invention, therefore, is to improve on the construction of these fallers or detectors, and this constitutes the first part of my invention.

The second part of the invention consists in an improved electromagnetic stop-motion mechanism, one of the principal objects of which is to so construct and arrange the parts of the stop-motion mechanism that the function of bringing the armature to the magnet is performed by a moving part of the machine. By making a moving part of the machinery bring the armature to the magnet I find it possible to keep in operative condition for a very considerable time a source of electrical energy having the minimum strength—such as a cheap form of dry battery—for the magnet is then only required to do the work of maintaining the contact, and by further arranging the electrical mechanism so that the circuit is not complete until the armature is brought against the magnet, I am even able to save the loss of electrical energy that would otherwise occur if the magnet were permitted to coact in bringing the armature into contact with the magnet.

The third part of the invention consists in an improved mechanism for mounting the fallers or detectors.

My invention consists in certain other features hereinafter set forth and claimed.

My invention will be found fully illustrated in the accompanying drawings, wherein—

Figure 2:
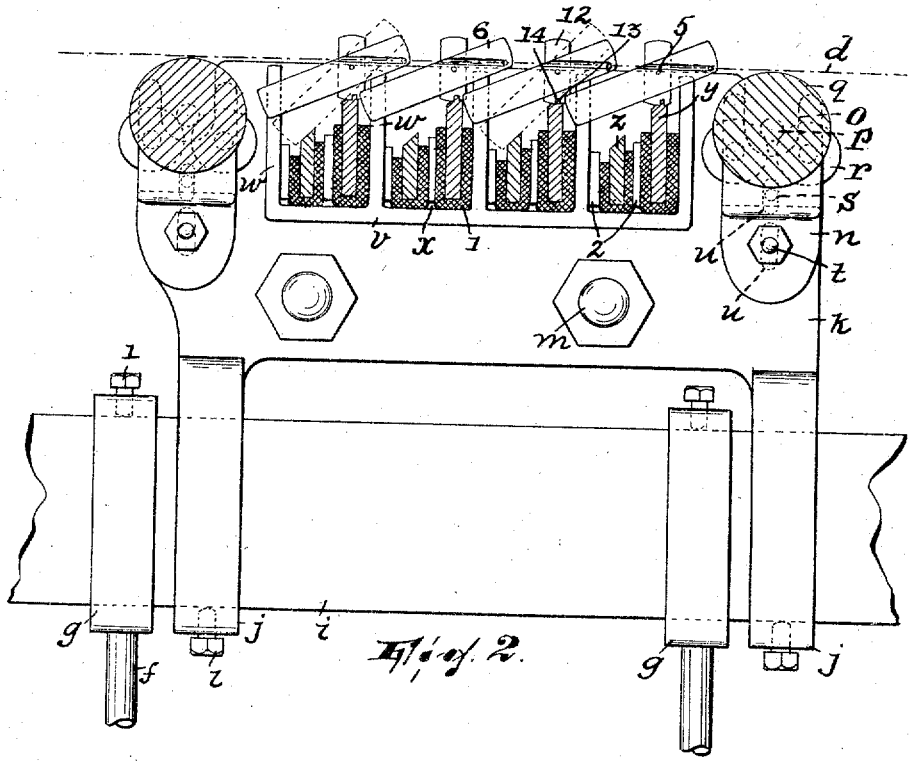
Figures 3, 4, 5, 6, 7, 8:
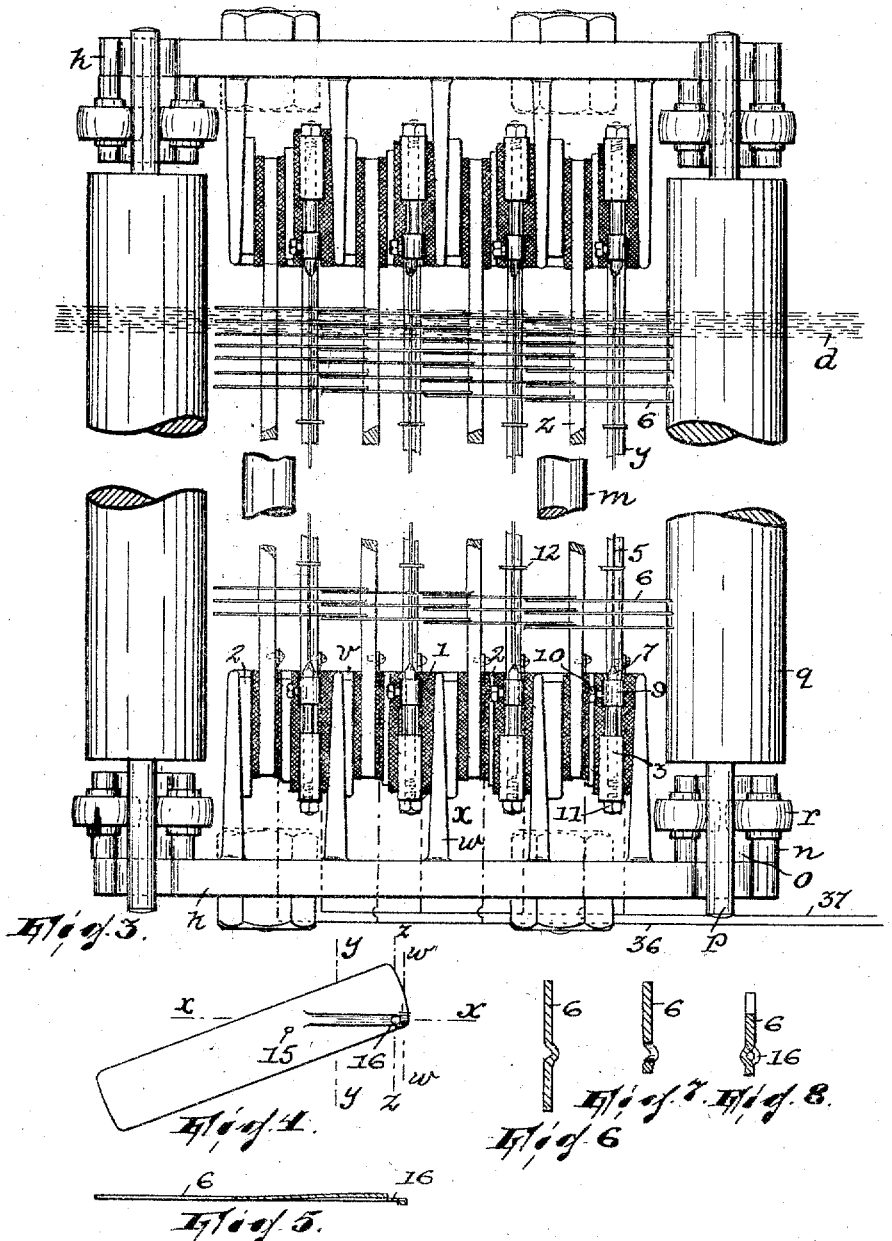
Figure 9:
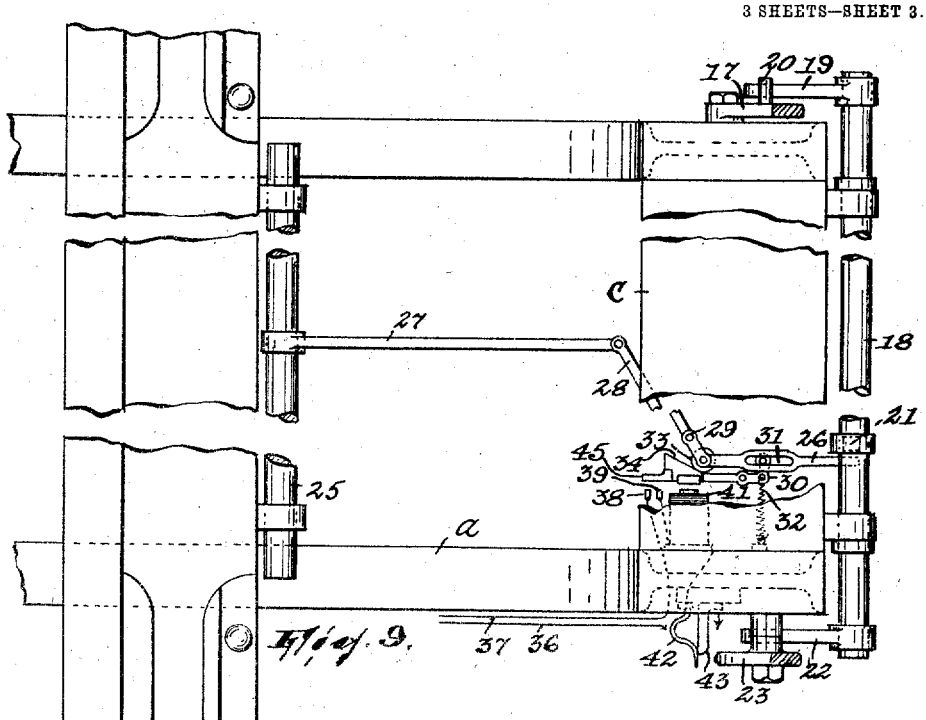
Figure 11:
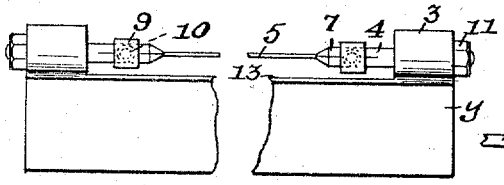
Figure 10:
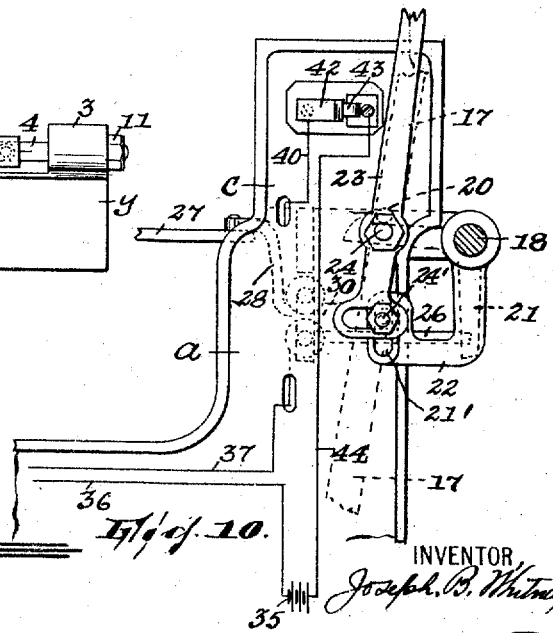

Figure 1 is a view in side elevation of a loom provided with my improved electromagnetic stop-motion as applied to the warp. Fig. 2 is an enlarged vertical sectional view of the warp stop-motion, taken in the direction of the length of the warp and involving that portion of the mechanism which comprises the fallers or detectors, the contact bars or strips, and the supporting means for these parts. Fig. 3 is an enlarged top plan view of that portion of the loom, as shown in Fig. 1, from which the sectional view, Fig. 2, is taken. Fig. 4 is a side view of one of the fallers or detectors; Figs. 5, 6, 7, and 8 are sectional views on the lines *x x*, *y y*, *z z*, and *w w*, respectively, in Fig. 4. Fig. 9 shows in plan that portion of the stop-motion mechanism of the loom seen in Fig. 1 which has immediately to do with the actuation of the part that controls the motion of the loom. Fig. 10 is a view in side elevation of what is seen in Fig. 9, and Fig. 11 is a view in front elevation of a certain bar *y*.

In the accompanying drawings, *a* designates the loom-frame; *b*, the batten; *c*, the breast-beam, and *d* the warp.

On a suitable part of the back portion of the loom-frame are secured pairs of brackets *e*, in which are mounted uprights *f*, formed with loops *g* at their upper ends, the connection between the brackets and the uprights being made adjustable and disconnective (so that, if desired, the whole mechanism supported by the uprights may be taken bodily out of the loom) by virtue of nuts *h*, which are screwed onto the uprights and rest on the brackets. Through the loops of each pair of uprights extends a bar *i*, which penetrates the loops *j* of one of a pair of frames *k*. The position of the bar in the loops *g* and of the frame *k* on said bar may be rendered adjustable by set-screws *l*, arranged in said loops and taking against the bar.

The frames *k* are secured together by braces *m*. Each frame carries a pair of brackets *n*, which at their upper ends are bifurcated, the recess *o*, formed by such bifurcation, receiving the spindle *p* of a roller *q*, which spindle rests on a pair of antifriction-rollers *r*, mounted in said bracket. The bracket is arranged for vertical adjustment in the frame *k* by means of a pin *s* and a bolt *t*, which project from the bracket and penetrate slots *u* in the frame *k*. The rollers *q* should be adjusted so as to barely touch against the under side of the warp *p* without appreciably deflecting it out of its natural plane.

Each frame *k* has projecting inwardly an integral shelf *v* and a series of integral vertical walls *w*, said shelf and vertical series of walls together forming pockets *x*. Into these pockets extend the ends of the contact strips or bars *y* and *z*, the strips being protected from contact with each other and with the frame *k* by insulating material 1. In order to secure the strips or bars *y z* snugly in place, wedges 2 are driven in between the insulated strips and also between one of the strips and the adjacent wall *w*. Each strip *y* is somewhat higher than the corresponding strip *z* and has its ends formed with elevations 3, which receive a chuck or bolt 4. This chuck or bolt is adapted to hold fast one end of a wire 5, on which the detectors or fallers 6, hereinafter to be described, are strung, and for this purpose its inner end is split, as at 7, for the reception of the wire and carries a band or collar 9, having a set-screw 10, whereby the split end of the chuck may be made to securely grip the wire. In order to regulate the tautness of the wire, the outer end of each chuck has screwed onto it a nut 11, which takes against the outer end of the bar *y*. It should be remarked that since the electrical connection between bars *y* and *z* is adapted to be produced by the turning of the detectors on the wire 5 as a fulcrum the top of the bar *z* is preferably beveled off, so as to make a good contact-surface for the detectors. In order to maintain the wire 5 from sagging, it is sustained at intervals by plate-like supports 12, which the wire penetrates and which rest on the bar *y*, and in order to keep these perpendicular the top of the bar *y* is formed with a tongue 13, snugly fitting a groove 14, cross-cut in the bottom of each support.

The detectors or fallers 6 are formed as clearly shown in Figs. 4 to 8, where they are seen as being thin strips, preferably having greater length than breadth and with one end heavier than the other, this latter being preferably effected by placing the fulcruming-opening 15 nearer one end of the device than the other. Thus they tend to assume a substantially perpendicular position, and this is normally resisted by the threads of the warp, which act to hold them, as seen in the drawings, where their lighter ends are depressed out of the perpendicular but not past the horizontal. The plane of the warp is below the tops of the lighter or rising ends of the detectors even in the normal or depressed positions thereof, and since this means that the lighter or rising ends of the detectors protrude at all times through the warp there is no possibility of a detector getting caught under any warp-thread. It should be remarked that the fulcruming-opening 15 is so disposed that when the detector is in the depressed position gravity will act to keep it (viewed from the front or rear) perpendicular. This is perhaps best accomplished by placing said opening nearer the longitudinal edge of the detector which is uppermost when said detector is depressed than the opposite edge, and it is augmented by placing the thread-eyelet 16, which is in the form of a perforation, near the opposite edge of the detector.

Heretofore where the detector has been made of the flat sheet-metal type, (in order to crowd a considerable number of them into a small space, as is necessary where they are used in connection with a warp in a loom,) it has been found that the threads not only tended to turn the detectors out of their true position on their supports and to wear grooves in the metal of the detectors, but became themselves abraded and sometimes even cut or broken by the detectors. This was because the thread was required in passing through the thread-eyelet of the detector to change from the plane of one side of the detector to that of the other—in other words, to make a turn in order to pass through the thread-eyelet of the detector. In order to overcome the objections above referred to and also be able to use a small thread-eyelet, and thus insure a level disposition of the fallers, I form each detector so that the metal at least at one edge portion of the thread-eyelet 16 is turned out of the plane of the metal of the detector on the other side of the eyelet. This may be done by displacing the portion of the metal indicated (or more) either side of the eyelet or, as is shown in the drawings and is preferable, both sides of the eyelet. From Fig. 5 it will be seen how in accordance with my manner of forming the detector the thread can pass through it without unduly contacting therewith. Again, it has been found of great practical advantange to bring the pivotal support into close proximity to the warp-plane, for the closer the thread of each faller is to its pivot the more readily it can act thereon whether of itself or when handled to move the faller along on its pivot. Occasionally the warp has to be parted, when the faller should give way readily, and after such parting the tension and back-and-forth action of the threads should return the fallers to their proper spacing, when the fallers should again give way readily instead of merely tilting over out of vertical planes. Again, when several rows or series of fallers are banked one after the other in the same plane this arrangement prevents (on the parting of the fallers in one series) the threads thereof slipping over the tops of fallers in the other series and in between fallers in that series where they do not belong.

The mechanism which is controlled by the electromagnetic means, (of which these detectors may form the circuit-closing means,) which is actuative upon the breaking of any warp-thread and which thereupon effects the stopping of the loom, may be any form of mechanism suitable for the purpose. A preferred form of this is shown in Figs. 9 and 10, where 17 is the controller or shipper lever whereby the braking of or throwing off the power from the loom is effected. 18 is a rock-shaft which is journaled in the breast-beam structure and carries a hook 19, adapted to engage a pin 20 on the shipper-lever 17 to hold said lever in its retracted position; 21, an arm extending downwardly from said rock-shaft; 22 and 23, levers, the former of which is carried by the rock-shaft and the other of which is fulcrumed at 24 and is the hand-lever for manually controlling lever 17, said lever 23 carrying a fixed bolt 24′, working in a slot 21′ in lever 22, so that upon the movement of one lever the other will move. 25 is any suitable shaft or other suitable part movable with the batten; 26, a feeler movable longitudinally and also laterally and connected at one end with an arm 27, projecting from the shaft 25, by a lever 28, which is fulcrumed in the breast-beam at 29, while the other end of said feeler is adapted under certain conditions to impinge against the arm 21 of the shaft 18 to rock the latter. 30 is another lever which is fulcrumed in the breast-beam and has one end engaging a slot 31 in the feeler 26 and normally pulled in one direction by a spring 32, while owing to the action of the batten (which imparts in an obvious manner longitudinal movements to the feeler 26) it is forced at regular intervals in the other direction by a roller 33, which engages an inclined surface 34, formed on the other end of the lever 30.

The mechanism just described operates as follows: As the batten reciprocates the feeler 26 is of course caused to reciprocate with it, as above stated, except that it moves in an opposite direction to that of the batten on account of the lever 28. Each time the feeler moves back its roller engages the inclined surface 34 of the lever 30, and this causes said lever 30 to turn on its fulcrum, causing its front end to move to the right far enough so that the feeler is alined with the arm 21. If nothing holds the lever 30 in the position it last assumed, as the batten moves back again said lever is free to return under action of its spring to its original position, so drawing the feeler out of the path of the arm 21. Therefore with means provided for holding the lever 34 in the position where it will keep the feeler 26 in the path of the arm 21 when the batten moves back the feeler will be caused to impinge against the arm and effectuate the release of the shipper-lever 17.

The means for holding the lever 30 in the position where it will be the direct cause of the stopping of the loom is the electromagnetic means, of which the detectors or fallers constitute the circuit-closers. Said electromagnetic means comprises a battery 35, a wire or other conductor 36, leading from the battery to the contact strips or bars *z*; another wire 37, leading from the contact-strips *y* to a contact-point 38; another contact-point 39, from which leads a wire 40, which includes the coils of an electromagnet 41 and which terminates in an elastic contact-piece 42; another contact-piece 43, with which the contact-piece 42 engages, and a wire 44, connecting the battery with the contact-piece 43. It should be remarked that the electromagnet is so placed as to be where the lever 30, which forms its armature, can contact with it; also, that the contact-pieces 38 39 are so disposed relatively to the magnet and to a circuit-closer 45, carried by the lever 30, that they will both be engaged by the circuit-closer to close the circuit no sooner than the magnet is engaged by its armature.

Assuming now that a warp-thread breaks and a detector is permitted to fall, as illustrated in Fig. 2 in dotted lines, so that it engages both contact-strips *y* and *z*, the circuit will be closed at this point. At the contact-pieces 42 and 43 the circuit is normally closed, it being remarked that at this point it is never broken except when (it being desirable to cut out the electrical apparatus when the loom is not running) the hand-lever 23 is thrown back, and so forces the elastic contact-point 42 out of engagement with the contact-point 43. Therefore, the circuit being established at the faller or detector and assuming, further, that the batten has advanced and through parts 27, 28, and 33 has effected the moving of the armature into engagement with the magnet and the circuit-closer 45 into contact with the contact-pieces 38 and 39 when the batten retracts, since the feeler 26 is now maintained in the path of the arm 21, it will cause the rocking of the shaft 18 and the consequent release of the controlling-lever 17. At the same time the hand-lever 23 will be thrown over, so as to push back the elastic contact-piece 42, breaking the circuit at this point, so that the energy of the battery is prevented from wasting. By means of the contact-points 38 and 39 the circuit is never complete until the magnet is engaged by the armature, and so another saving of the battery's energy is effected, and, furthermore, by employing mechanical means to move the armature to the magnet the simplest and cheapest form of electrical generator may be utilized, as heretofore stated.

Having thus fully described my invention, what I claim as new, and desire to secure by Letters Patent, is—

1. In a mechanism for detecting the breaking of a longitudinally-moving thread or other filament, the combination of a detector or faller and a pivotal support for said detector or faller, said detector or faller having one end heavier than the other, being adapted to be engaged by the thread between its pivot and its other end and held out of its gravity-maintained position by the thread, and, when so held, having its other end projecting above the thread, substantially as described.

2. In a mechanism for detecting the breaking of a longitudinally-moving thread or other filament, the combination of a detector or faller and a pivotal support for said detector or faller, said detector or faller having one end heavier than the other, being adapted to be engaged by the thread between its pivot and its other end and held out of its gravity-maintained position by the thread, and having its pivoting-point on that side of its longitudinal axis which is uppermost when said detector is engaged by the thread, substantially as described.

3. In a mechanism for detecting the breaking of a longitudinally-moving thread or other filament, a detector or faller consisting of a flattened strip having a perforation forming a thread-eyelet, the material of said faller or detector at the edge portion of said eyelet on one side thereof being disposed in a different plane from the material of said detector or faller at the edge portion of said eyelet on the other side thereof, substantially as described.

4. In a mechanism for detecting the breaking of a longitudinally-moving thread or other filament, a detector or faller consisting of a flattened strip having a perforation forming a thread-eyelet, the material of said detector or faller on one side of said eyelet being disposed in a plane different from that on the other side of said eyelet, substantially as described.

5. In a mechanism for detecting the breaking of a longitudinally-moving thread or other filament, a detector or faller consisting of a flattened strip having a perforation forming a thread-eyelet, said perforation having its axis or thread-line disposed approximately parallel with the plane of said detector or faller, substantially as described.

6. In an electromagnetic stop-motion for textile machinery having to do with longitudinally-moving threads, the combination of an electric circuit, a circuit-closer adapted to be controlled by one of the threads, an electromagnet adapted to be controlled by said circuit, an armature for said magnet, and means for moving the armature against the magnet at stated periods, substantially as described.

7. In an electromagnetic stop-motion for looms, the combination of an electric circuit, a circuit-closer adapted to be controlled by one of the warp-threads which is to form the material produced by the loom, an electromagnet adapted to be controlled by said circuit, an armature for said magnet, and means for moving the armature against the magnet at stated periods, substantially as described.

8. In an electromagnetic stop-motion for looms, the combination, with the batten, of an electric circuit, a circuit-closer adapted to be controlled by one of the warp-threads which is to form the material produced by the loom, an electromagnet adapted to be controlled by said circuit, an armature for said magnet, and means, actuative from the batten, for periodically moving the armature against the magnet, substantially as described.

9. In an electromagnetic stop-motion for looms, the combination of an electric circuit, a circuit-closer adapted to be controlled by one of the warp-threads which is to form the material produced by the loom, an electromagnet adapted to be controlled by said circuit, an armature for said magnet, the batten, and operative connecting means between the batten and the armature whereby said armature is periodically moved against the magnet, substantially as described.

10. In a loom, the combination, with the controller for the movement thereof, of an electric circuit, a circuit-closer adapted to be controlled by one of the warp-threads which is to form the material produced by the loom, an electromagnet controlled by said circuit, an armature for said magnet, means for periodically moving said armature against the magnet, and power-transmitting mechanism operatively connecting said armature and said controller, substantially as described.

11. In an electromagnetic stop-motion for textile machinery having to do with longitudinally-moving threads, the combination of an electric circuit, a circuit-closer adapted to be controlled by one of the threads, an electromagnet adapted to be controlled by said circuit, an armature for said magnet, said circuit having a break therein, means for moving the armature against the magnet at stated periods, and means for closing the circuit at said break upon contact of the armature with the magnet, substantially as described.

12. In an electromagnetic stop-motion for textile machinery having to do with longitudinally-moving threads, the combination of supporting structures having opposed pockets, contact strips or bars sustained at their ends in said pockets, insulation separating the strips or bars from each other and from said supporting structures, and wedges interposed between said strips or bars and the supporting structures, substantially as described.

13. In a stop-motion for looms, the combination of a series of fallers or detectors engaging the warp, mechanism controlled by said fallers or detectors for stopping the loom upon the breaking of a warp-thread and the consequent dropping of a faller or detector, spaced rollers sustaining the warp, said fallers or detectors being arranged between said rollers, and means for vertically adjusting said rollers, substantially as described.

14. In a stop-motion for looms, the combination of spaced frames, fallers or detectors, sustaining means for said fallers or detectors arranged in said frames, vertically-adjustable brackets arranged in said frames, and spaced rollers journaled in said brackets, said detectors or fallers being disposed between said rollers and adapted to engage the warp-threads, substantially as described.

15. A support for the detectors or fallers of a stop-motion mechanism for longitudinally-moving threads consisting of a bar having elevations on its end portions, chucks adjustably secured in said elevations, and a wire mounted in and stretched between said chucks, substantially as described.

16. In a stop-motion mechanism for looms, the combination of a movable member, 18, a longitudinally and laterally movable part, 26, said member having a projection adapted to be engaged by said part, a lever, supporting means for the lever, said lever being operatively connected with said part at one of its ends to effect the lateral movement thereof, a movable element *b* of the loom, operative connecting means between said element and said part adapted to effect the longitudinal movement of the latter, and means for moving said lever on its fulcrum, substantially as described.

17. In a stop-motion mechanism for looms, the combination of a movable member, 18, a longitudinally and laterally movable part, 26, said member having a projection adapted to be engaged by said part, a fulcrumed armature, supporting means for the armature, said armature being operatively connected with said part at one of its ends to effect the lateral movement thereof, a movable element *b* of the loom, operative connecting means between said element and said part adapted to effect the longitudinal movement of the latter and also chgageable with the armature to move the same on its fulcrum and so move said part laterally, an electric circuit comprising a magnet coöperative with the armature, and fallers arranged in said circuit and constituting circuit-closers, said fallers being normally held by threads being operated upon to maintain the circuit open, substantially as described.

18. In a mechanism for detecting the breaking of a longitudinally-moving thread or other filament, the combination of a detector or faller and a pivotal support for said detector or faller, said detector or faller having one end heavier than the other and being adapted to be engaged by the thread between its pivot and its other end and near its relatively lower longitudinal edge and to be held out of its gravity-maintained position by the thread, whereby, when so held, its other end projects above the thread, substantially as described.

19. The combination of the loom-frame, the fallers, contact devices for the fallers, a supporting structure for said contact devices and fallers, and means for sustaining said structure in the loom-frame for adjustment longitudinally, substantially as described.

20. The combination of a plurality of series of pivoted fallers, and a plurality of horizontal pivotal supports, one for each series of fallers, arranged substantially parallel with each other and closer together than the distance represented by the length of each faller, said fallers being thus adapted when operatively engaged by the threads to stand in parallel inclined planes, overlapping each other, substantially as described.

21. In combination, with means for sustaining the warp, a pivoted faller, and a pivotal support therefor disposed in close proximity to and parallel with the plane of the warp.

In testimony whereof I have hereunto signed my name in the presence of two subscribing witnesses.

JOSEPH B. WHITNEY.

Witnesses:
WM. D. BELL,
JOHN W. STEWARD.